United States Patent [19]
Imai et al.

[11] Patent Number: 6,107,782
[45] Date of Patent: Aug. 22, 2000

[54] MULTI-STAGED METHOD FOR RECHARGING A LEAD ACID BATTERY AS A FUNCTION OF INTRINSIC BATTERY CHARACTERISTICS

[75] Inventors: Hiroshi Imai, Toyohashi; Yoshitaka Aoki, Wakayama-ken, both of Japan

[73] Assignee: Matsushita Electric Industrial Co., Ltd., Osaka, Japan

[21] Appl. No.: 09/286,703

[22] Filed: Apr. 6, 1999

[30] Foreign Application Priority Data

| Apr. 7, 1998 | [JP] | Japan | 10-094325 |
| Apr. 7, 1998 | [JP] | Japan | 10-094326 |
| Apr. 7, 1998 | [JP] | Japan | 10-094327 |

[51] Int. Cl.$^7$ .................................................. H01M 10/44
[52] U.S. Cl. .............................................. 320/150; 320/160
[58] Field of Search ................................ 320/125, 137, 320/150, 155, 157, 160, 162

[56] References Cited

U.S. PATENT DOCUMENTS

| 4,710,694 | 12/1987 | Sutphin et al. | 320/139 |
| 5,617,007 | 4/1997 | Keidl et al. | 320/141 |
| 5,670,863 | 9/1997 | Broell et al. | 320/145 |
| 5,710,506 | 1/1998 | Broell et al. | 320/145 |
| 5,736,834 | 4/1998 | Kuno | 320/146 |

*Primary Examiner*—Edward H. Tso
*Attorney, Agent, or Firm*—Michael K. Kelly; Snell & Wilmer, LLP

[57] ABSTRACT

A method for charging a lead lead-acid battery includes a first step of charging the lead lead-acid battery to a prescribed voltage; and a second step of calculating a second charging electricity quantity based on a first charging electricity quantity to which the lead lead-acid battery is charged in the first step, and charging the lead lead-acid battery based on the second charging electricity quantity.

13 Claims, 11 Drawing Sheets

MULTI-STAGED METHOD FOR RECHARGING A LEAD ACID BATTERY AS A FUNCTION OF INTRINSIC BATTERY CHARACTERISTICS

BACKGROUND OF THE INVENTION

1. Field of the Invention

The present invention relates to a method for charging a lead lead-acid battery, and in particular to a method for charging a rechargeable closed lead lead-acid battery.

2. Description of the Related Art

There are various methods for charging lead lead-acid batteries, for example, constant-voltage charging, quasi-constant-voltage charging, constant-current charging, and joggle charging (pulse charging). These charging methods are carried out so as to obtain an appropriate charging state without any charge insufficiency or charge excessiveness, so that the cycle life feature of the lead lead-acid battery is fully utilized.

Figure 11:
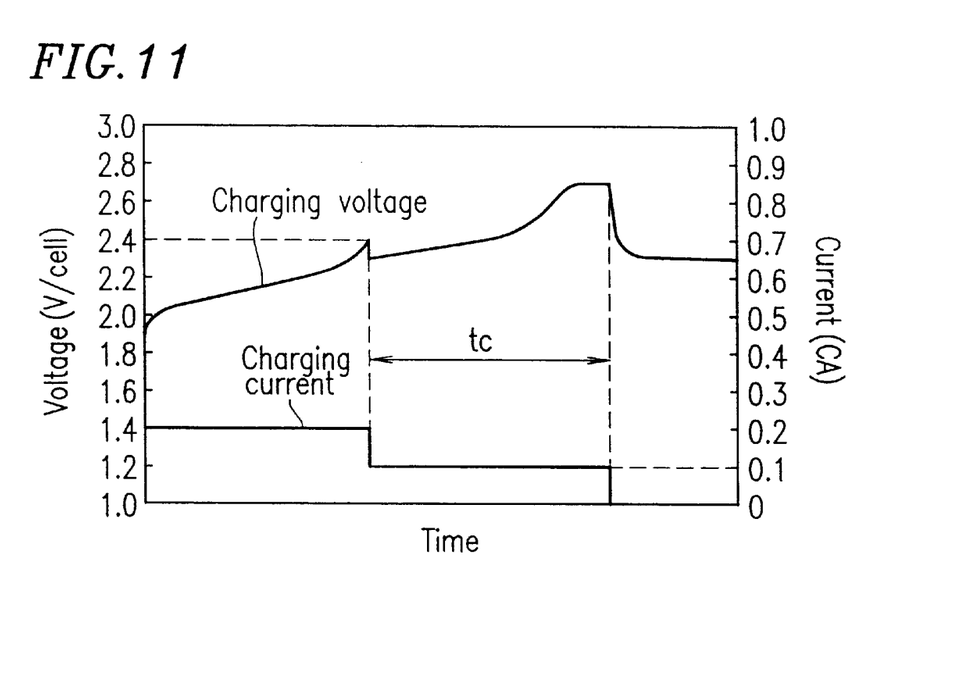
FIG. 11 is a graph illustrating a charging pattern obtained by a timer-controlled two-stage constant-current charging system.

Hereinafter, a conventional, general method for charging a cell will be described. FIG. 11 shows a charging pattern obtained by a two-stage constant-current charging system using a conventional timer control. In FIG. 11, during a second-stage charging time period tC, charging is performed at a current of 0.1 CA. During the time period tC, a constant quantity of electricity is supplied to a lead lead-acid battery by a timer in which a charging time period is pre-set, regardless of a quantity of electricity discharged before charging. As a result, there is an undesirable possibility that the lead lead-acid battery is excessively charged when a small quantity of electricity is discharged before charging, and is insufficiently charged when a large quantity of electricity is discharged before charging. These undesirable effects result from the difficulty in setting an appropriate charging time period tC in the timer.

Figure 12:
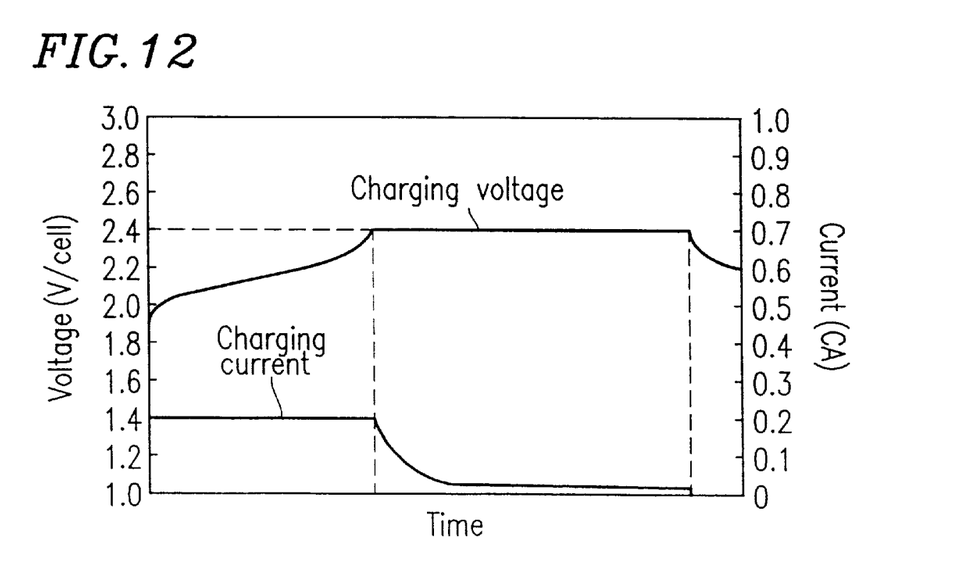
FIG. 12 is a graph illustrating a charging pattern obtained by a constant-voltage charging system.

FIG. 12 shows a charging pattern obtained by a constant-voltage charging system. According to this system, it is possible to automatically supply a quantity of electricity corresponding to the quantity of electricity discharged before charging. However, since the quantity of chargeable electricity is automatically restricted by a receivable electricity quantity of each of lead lead-acid batteries, the lead lead-acid batteries tend to be slightly insufficiently charged. Thus, the cycle life feature of the lead lead-acid batteries cannot be fully utilized.

The present invention has objectives of solving such insufficient charging caused by a constant-voltage charging system, solving a problem of a timer-system constant-current charging system in that a constant quantity of electricity is supplied to a lead lead-acid battery regardless of the quantity of electricity discharged before charging, and providing a charging method for performing appropriate charging of the lead lead-acid battery without any insufficiency or excessiveness.

SUMMARY OF THE INVENTION

A method for charging a lead lead-acid battery according to the present invention includes a first step of charging the lead lead-acid battery to a prescribed voltage; and a second step of calculating a second charging electricity quantity based on a first charging electricity quantity to which the lead lead-acid battery is charged in the first step, and charging the lead lead-acid battery based on the second charging electricity quantity. Thus, the above-described objectives are achieved.

The first step can include the steps of charging the lead lead-acid battery to the prescribed voltage using a first constant charging current, and charging the lead lead-acid battery until the lead lead-acid battery obtains a prescribed current, using the first constant charging voltage. The second step can include the step of charging the lead lead-acid battery for a prescribed time period using a second constant charging current which is lower than the first constant charging current. The prescribed time period can be set based on the first charging electricity quantity.

The first step can further include the step of measuring a cell temperature of the lead lead-acid battery. The second step can include the step of, when the cell temperature is lower than a prescribed value, increasing the second charging electricity quantity by a level of a receivable charge coefficient reduced in the first step.

The first step can also include the steps of charging the lead lead-acid battery to the prescribed voltage using a first constant charging current, and charging the lead lead-acid battery to the prescribed voltage using a second constant charging current which is lower than the first constant charging current.

The second step can include the step of charging the lead lead-acid battery for a prescribed time period using a third constant charging current which is lower than either one of the first charging current or the second charging current. The prescribed time period can be set based on the first charging electricity quantity.

Another method for charging a lead lead-acid battery according to the present invention includes a first step of charging the lead lead-acid battery to a prescribed voltage using a first constant charging current, and an n-stage step for charging the lead lead-acid battery using an n'th constant charging current. The n'th constant charging current is set based on an appropriate charging electricity quantity corresponding to an electricity quantity discharged from the lead lead-acid battery, a charging time period required for charging in the first step, and a cell temperature of the lead lead-acid battery while the cell is charged in the first step; where n includes an integer of 2 or more. Thus, the above-described objectives are achieved.

Still another method for charging a lead lead-acid battery according to the present invention includes an n-stage step of charging the lead lead-acid battery to a prescribed voltage using an n'th constant charging current. The n'th constant charging current is set based on an appropriate charging electricity quantity corresponding to an electricity quantity discharged from the lead lead-acid battery, a charging time period required for charging in each of first through (n-1)th stages, and a cell temperature of the lead lead-acid battery while the cell is charged in the first stage; where n includes an integer of 2 or more. Thus, the above-described objectives are achieved.

In order to achieve the above-described objectives, the present invention adopts a charging system including a first step of charging a lead lead-acid battery using a constant charging current and, when a set voltage is detected at the terminal, continuing charging the cell until a set current value with the voltage being maintained constant and the current being attenuated, and a second step of subsequently charging the cell at a constant current. In such a charging system, the charging electricity quantity and especially the charging time period are controlled based on the quantity of electricity charged in the first step.

The deterioration with cycles of the discharge capacity is prevented even as the cycles progress. Since the charging time period in the second step is controlled based on the charging time period and the cell temperature from the start of the first stage to the second stage of the first step, proper charging with a minimum of excessiveness or insufficiency is realized. Accordingly, the deterioration with cycles of the discharge capacity of the lead lead-acid battery is mitigated even as the cycles progress regardless of the discharge depth or temperature.

DETAILED DESCRIPTION OF PREFERRED EMBODIMENTS

Figure 1:
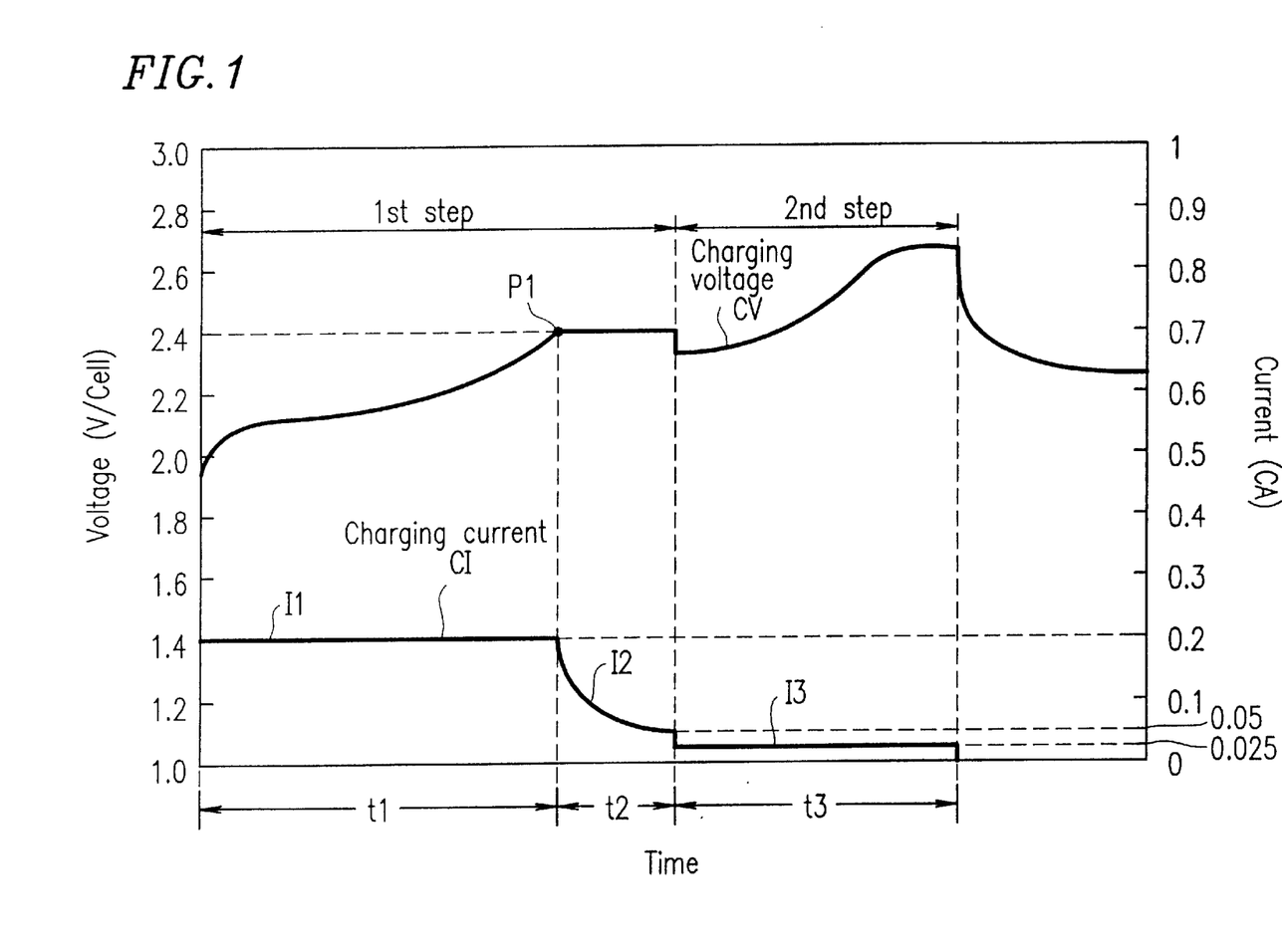
FIG. 1 is a graph illustrating a charging pattern in one example according to the present invention.
Figure 2:
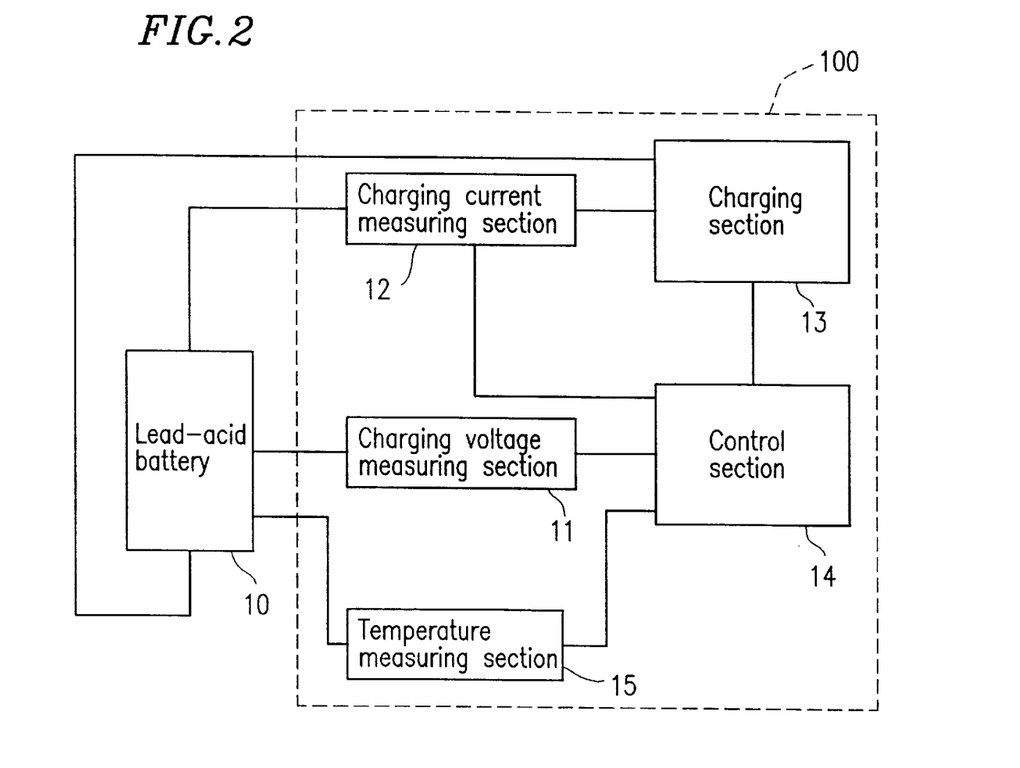
FIG. 2 is a view illustrating a structure of a charging apparatus for carrying out a charging method according to the present invention.
Figure 3:
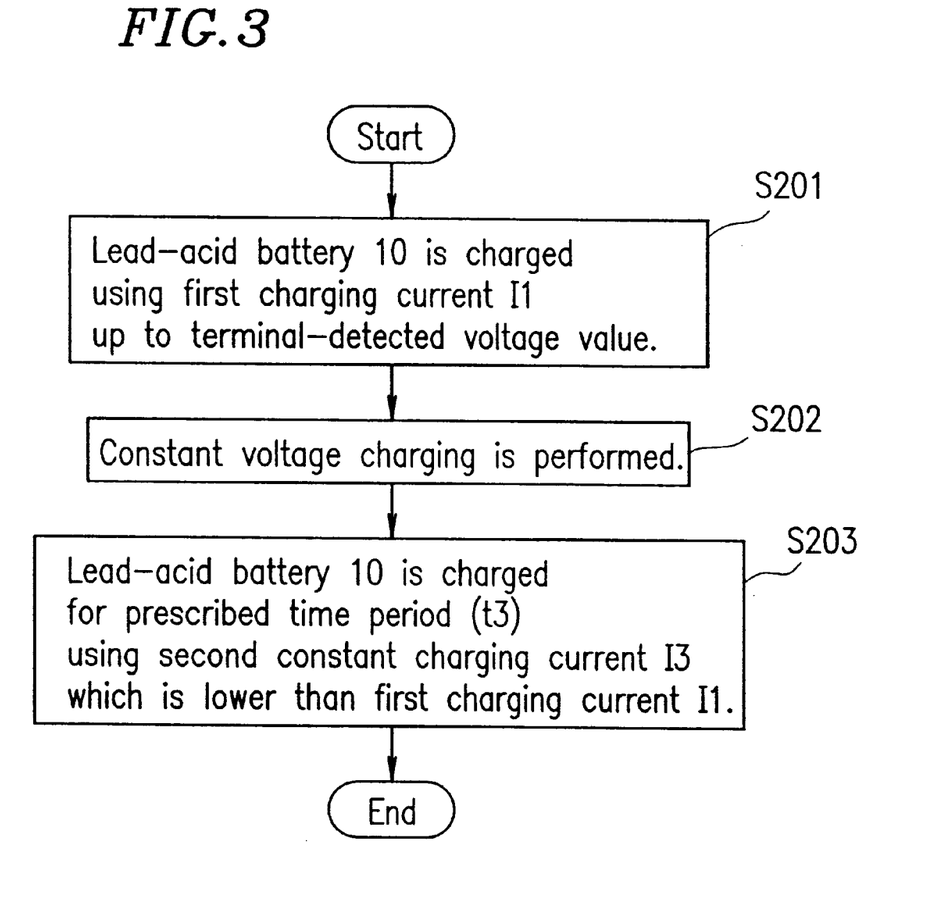
FIG. 3 is a flowchart illustrating the charging method according to the present invention.

An exemplary charging system in one example according to the present invention will be described hereinafter, with reference to the figures. FIG. 1 shows a charging voltage and a charging current in accordance with a charging method according to the present invention. FIG. 2 shows a structure of a charging apparatus 100 for carrying out the charging method according to the present invention. FIG. 3 shows a flowchart of the charging method according to the present invention.

With reference to FIG. 2, the charging apparatus 100 includes a charging voltage measuring section 11 for measuring a charging voltage CV of a lead-acid battery 10, a charging current measuring section 12 for measuring a charging voltage current CI of the lead-acid battery 10, a temperature measuring section 15 for measuring a cell temperature of the lead-acid battery 10, a charging section 13 for charging the lead-acid battery 10, and a control section 14 for controlling the charging section 13.

With reference to FIGS. 1, 2 and 3, the charging section 13 performs charging at a constant current I1=0.2 CA. When the charging voltage CV measured by the charging voltage measuring section 11 becomes equal to a terminal-detected voltage value (e.g., 2.4 V/cell) (point P1) as a result of the constant current charging, the control section 14 switches the charging section 13 to a constant voltage charging mode. The charging at the constant current is performed for a time period t1 at the current value of I1 (Step 201). After that, the charging section 13 performs constant voltage charging until the charging current measured by the charging current measuring section 12 becomes equal to a termination current value (e.g., 0.05 CA) (Step 202). The charging at the constant voltage is performed for a time period t2, and the average current value during this period is I2 (Step 201). The process up to this point is defined as a first step.

Next, in a second step, the charging section 13 performs constant current charging at a current of I3=0.025 CA. After a prescribed quantity of electricity is supplied (Step 203), the charging is terminated. A charging time period t3 at this point is set as described below.

First, a first-step charging electricity quantity Q1 supplied in the first step is calculated by the following expression.

$$Q1=(I1 \times t1)+(I2 \times t2)$$

The first-step charging electricity quantity Q1 can be found by the sum of: i) the logical product of the current I1 when the charging is performed at 0.2 CA and the charging time period t1; and ii) the logical product of the average current I2 when the charging is performed at 2.4 V/cell and the charging time period t2.

Where the quantity of electricity discharged before charging is Qd, an appropriate charging electricity quantity can be found by multiplying Qd by a charge efficiency coefficient Ce. Accordingly, the second-stage charging electricity quantity (Q2) required to be supplied in the second step is calculated by the following expression, by which the first-step charging electricity quantity Q1 is subtracted from the appropriate charging electricity quantity (Ce×Qd).

$$Q2=(Ce \times Qd)-Q1$$

A second-step charging time period t3 is set by the following expression.

$$t3=Q2/I3$$

The value of the electricity quantity discharged before charging(Qd) can be obtained by accurately measuring the first-step charging electricity quantity Q1 which automatically changes in accordance with the value of Qd. In the above-described example, $$Q1=Cq \times Qd.$$

As a receivable charge coefficient Cq, a value of 0.95 to 1.05 may be used. Thus, the second-step charging time period t3 for controlling the second-step charging electricity quantity can be obtained accurately. In other words, the second-step charging time period t3 is determined based on the first-step charging electricity quantity Q1 which is supplied in the first step, i.e., from the start of first-stage charging until a charging voltage in the second stage is changed. Thus, the charge capacitance for the second step can be determined.

As the charge efficiency coefficient Ce, a value in the range of 1.05 to 1.25 may be used. A value smaller than 1.05 results in insufficient charging, and a value larger than 1.25 results in excessive charging.

The above-described charging method can be carried out at 25° C. Since a receivable electricity quantity in the first stage changes as a function of temperature, correction is necessary in accordance with the temperature of the lead lead-acid battery 10 measured by the temperature measuring section 15. The terminal-detected voltage value for switching the constant current charging to the constant voltage charging in the first step can be corrected by the amount of approximately −5 mV/cell·° C. by the control section 14.

The receivable charge coefficient Cq used by the control section 14 can be Cq20=0.95 to 1.05 at a temperature of 20° C. or higher as described above. At a temperature of 0° C. or lower, the value of Cq0=0.85 to 0.95 can be used. At a temperature between 0 to 20° C., the value of Cq can be changed in accordance with the temperature or an intermediate value between Cq20 and Cq0 can be used. It is considered that such values can be used because the receivable electricity quantity is lowered as the cycles progress at low temperature. Although little change is exhibited at room temperature, a significant change is exhibited at low temperature. In an early period of the charge and discharge cycles, the value of Cq at low temperature is similar to the value of Cq at room temperature.

Figure 4:
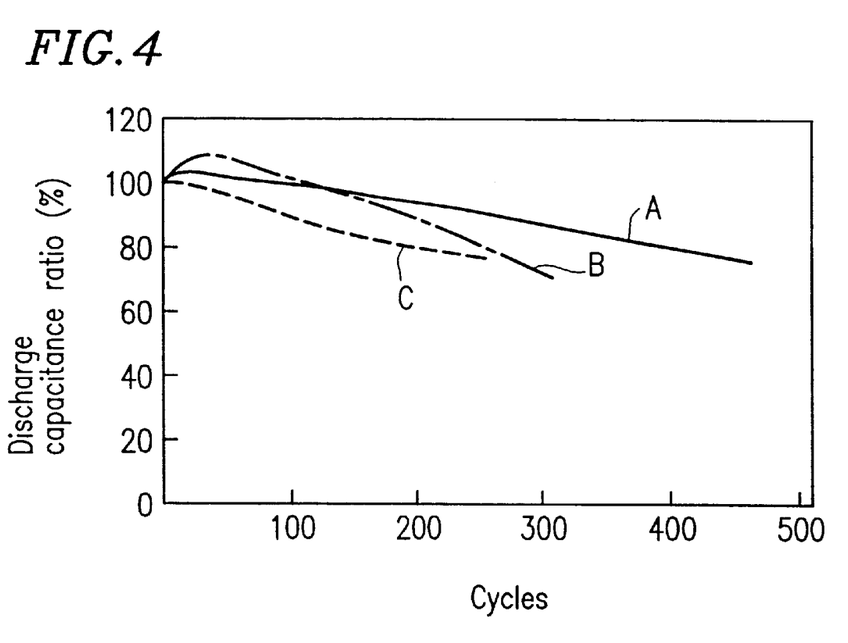
FIG. 4 is a graph illustrating characteristics obtained according to the present invention and a conventional example.

Using a closed lead-acid battery 10 having a voltage of 12 V and a rated capacitance of 60 Ah, a charge and discharge cycle test was performed while measuring the charging time period. FIG. 4 shows a change in the discharge capacitance ratio (i.e., ratio of the discharge capacitance in a cycle with respect to the initial discharge capacitance) as a function of the number of cycles.

The test conditions were as follows. The temperature was 25° C. Discharging was performed at a constant current of 20 A and a discharge depth of 80%. Discharging was performed every 50 cycles at a constant current of 20 A down to 9.9 V. Thus, the change in the capacitance was checked.

Curve A represents a cycle life characteristic obtained by the charging pattern in this example. The charge efficiency coefficient Ce was set to be 1.15, and the receivable charge coefficient Cq was set to be 0.98. Curve B represents a cycle life characteristic obtained by a conventional two-stage constant current charging pattern (charging current in the first stage: 0.2 CA: charging current in the second stage: 0.05 CA). Curve C represents a cycle life characteristic obtained by a conventional constant voltage charging pattern (0.24 V/cell).

As can be appreciated from FIG. 4, in the case of curve B using a conventional two-stage constant current charging, the discharge capacitance ratio is high during an initial period of the charge and discharge cycles due to a high charging current in the second stage. However, the discharge capacitance ratio significantly deteriorates as the cycles progress. This indicates that the cell life is short. In the case of curve C by the conventional constant voltage charging, the discharge capacitance ratio does not increase since the charging tends to be insufficient. This also indicates that the cell life is short. By contrast, in the case of curve A, the discharge capacitance ratio does not substantially deteriorate as the charge and discharge cycles progress due to the low charging current in the second stage. Insufficient charging does not occur because the charging is performed without any excessiveness or insufficiency. Thus, a satisfactory cycle life characteristic is obtained.

Figure 5:
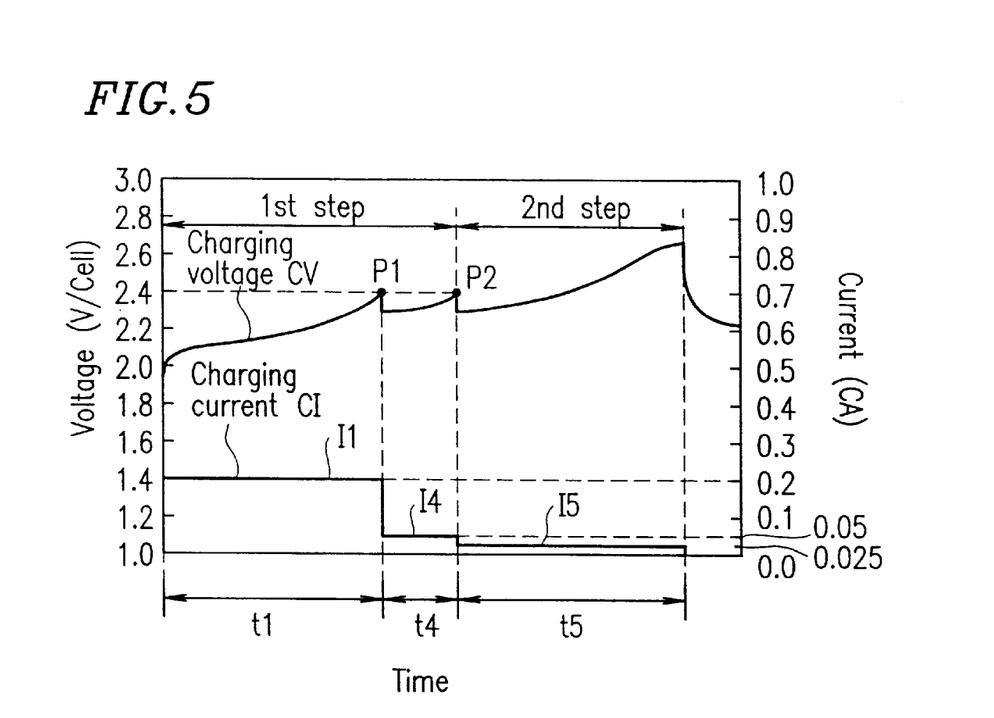
FIG. 5 is a graph illustrating a charging pattern in another example according to the present invention.
Figure 6:
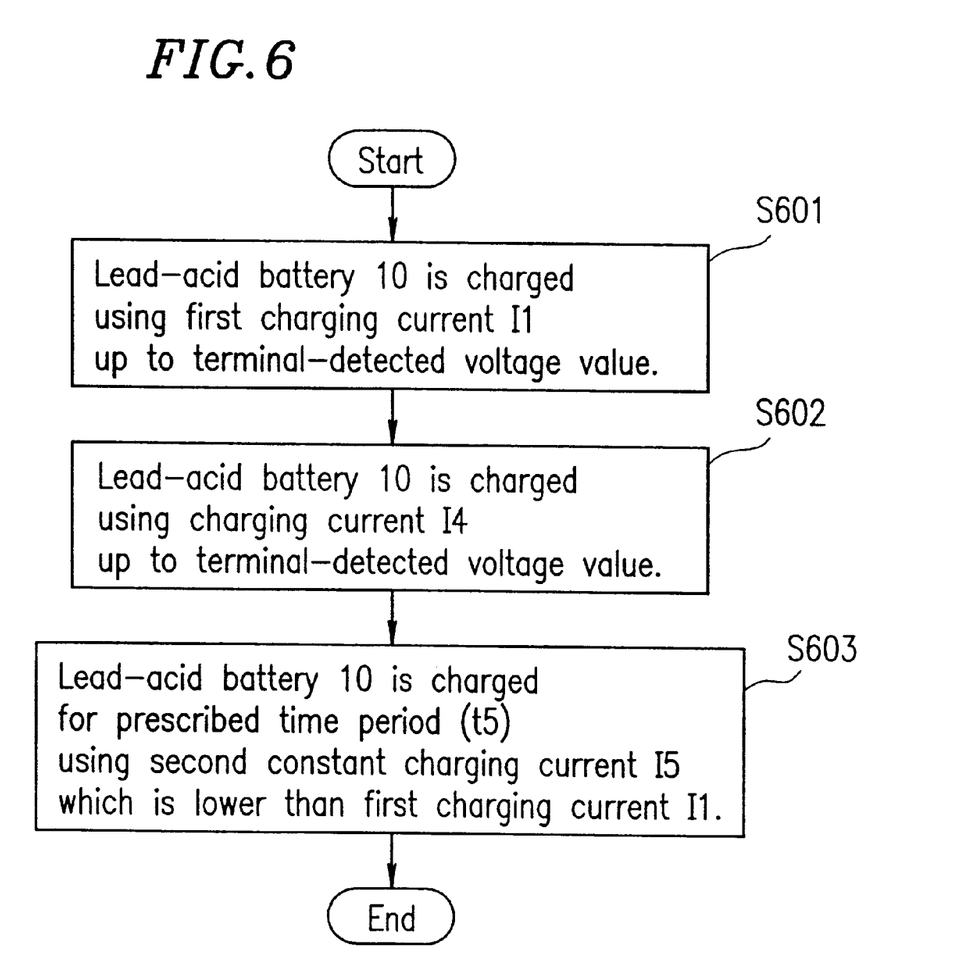
FIG. 6 is an alternate flowchart illustrating a charging method according to the present invention.

FIG. 5 shows a charging pattern in another example according to the present invention. FIG. 6 is a flowchart showing a method for charging in this example according to the present invention.

With reference to FIGS. 5 and 6, the charging section 13 performs constant current charging (Step 601) at I1=0.2 CA in a first stage of a first step. When the charging voltage CA measured by the charging voltage measuring section 11 becomes equal to a terminal-detected voltage value (e.g., 2.4 V/cell) (point P1) as a result of the constant current charging, the control section 14 performs constant current charging with a different level of charging current supplied by the charging section 13. The current value at this point is I4=0.05 CA. When the charging voltage CV measured by the charging voltage measuring section 11 becomes equal to a terminal-detected voltage value (e.g., 2.4 V/cell) (point P2), a second stage in the first step is terminated (Step 602), and a second step is started.

Subsequently, the charging section 13 performs constant current charging at a current of I5=0.025 CA in the second step. After a prescribed quantity of electricity is supplied (Step 603), the charging is terminated. A charging time period t5 for this step of charging is set in the following manner.

First, a first-step charging electricity quantity Q1 is calculated by the following expression.

$$Q1=(I1 \times t1)+(I4 \times t4)$$

Here, the first-step charging electricity quantity Q1 can be found by the sum of the logical product of the current I1 when the charging is performed at 0.2 CA and the charging time period t1, and the logical product of the current I4 when the charging is performed at 0.05 CA and the charging time period t4.

Where the electricity quantity discharged before charging is Qd, an appropriate charging electricity quantity can be found by multiplying Qd by a charge efficiency coefficient Ce. Accordingly, the second-step charging electricity quantity required to be supplied in the second step (Q2) is calculated by the following expression, by which the first-step charging electricity quantity Q1 is subtracted from the appropriate charging electricity quantity (Ce×Qd):

$$Q2=(Ce \times Qd)-Q1$$

A second-step charging time period t5 is set by the following expression.

$$t2=Q2/I5$$

The value of the electricity quantity discharged before charging (Qd) can be obtained by accurately measuring the first-step charging electricity quantity Q1 which automatically changes in accordance with the value of Qd. In the above-described example, $$Q1=Cq \times Qd$$

As a receivable charge coefficient Cq, a value of 0.95 to 1.05 may be used. Thus, t5 for controlling the second-step charging electricity quantity can be obtained accurately. In other words, the charging time period t5 is determined based on the first-step charge capacitance, and thus the charge capacitance for the second step can be determined.

As the charge efficiency coefficient Ce, a value in the range of 1.05 to 1.25 may be used. A value smaller than 1.05 results in insufficient charging, and a value larger than 1.25 results in excessive charging.

The above-described charging method can be carried out at 250° C. Since a receivable electricity quantity in the first stage changes in accordance with the temperature, correction is necessary in accordance with the temperature. The terminal-detected voltage value for switching the value of the constant charging current charging in the first step can be corrected by approximately −5 mV/cell·° C.

The receivable charge coefficient Cq can be Cq20=0.95 to 1.05 at a temperature of 20° C. or higher as described above. At a temperature of 0° C. or lower, the value of Cq0=0.85 to 0.95 can be used. At a temperature between 0 to 20° C., the value of Cq can be changed in accordance with the temperature or an intermediate value between Cq20 and Cq0 can be used. It is considered that such values can be used because the receivable electricity quantity is lowered as the cycles progress at low temperature. Although little change is exhibited at room temperature, a significant change is exhibited at low temperature. In an early period of the charge and discharge cycles, the value of Cq at low temperature is similar to the value of Cq at room temperature.

According to the charging method of the lead-acid battery described above with reference to FIGS. 5 and 6, the same effects as those of the charging method described with reference to FIG. 4 can be obtained.

Figure 7:
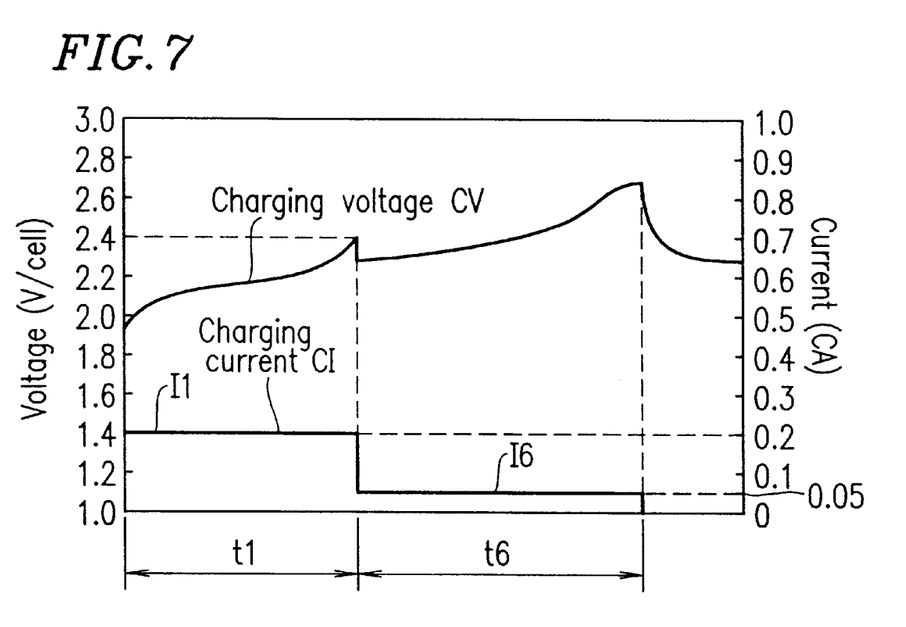
FIG. 7 is a graph illustrating a charging pattern in still another example according to the present invention.
Figure 8:
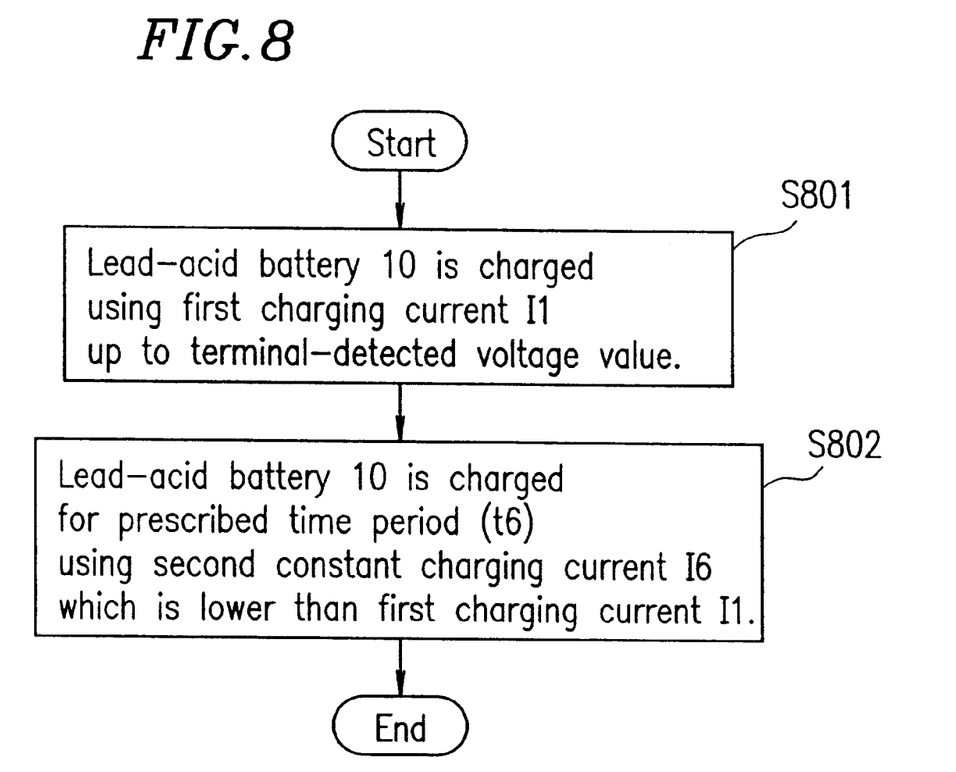
FIG. 8 is an alternate flowchart illustrating a charging method according to the present invention.

FIG. 7 shows a charging pattern in still another example according to the present invention. FIG. 8 is a flowchart showing a method for charging in the the pattern shown in FIG. 7.

With reference to FIGS. 7 and 8, first-stage charging is performed at a constant current of I1=0.2 CA (Step 801), and second-stage charging is performed at a constant current of I1=0.05 CA (Step 802). The terminal-detected voltage value for switching the first stage to the second stage during the charging is 2.4 V.

Where the second-stage constant current is I6=0.025 to 0.05 CA and the terminal voltage at Tb° C. is {2.4+(25-Tb)×0.005} V/cell, the lead lead-acid battery can be charged in accordance with the following expression.

$$t6=(Ce \times Qd - I1 \times t1)/I6$$

The expression means that a charging time period t6 required for the second-stage constant current charging can be obtained as follows. The appropriate charging electricity quantity (Qd×Ce) is obtained by multiplying the electricity quantity discharged before charging (Qd) by the charge efficiency coefficient Ce. The first-stage charging electricity quantity is obtained by multiplying the first-stage charging current I1 by the time period t1 from the start of the charging until the charging voltage becomes equal to a terminal-detected voltage for switching the value of the charging current. The charging time period t6 is obtained by subtracting the first-stage charging electricity quantity from the appropriate charging electricity quantity, and then dividing the subtraction result by the second-stage constant charging current I6.

As the charge efficiency coefficient Ce, a value in the range of 1.05 to 1.25 may be used. A value smaller than 1.05 results in insufficient charging, and a value larger than 1.25 results in excessive charging. The charging current I6 can be 0.05 CA at 0° C. or lower and 0.025 CA at 25° C. or higher, and can be set in accordance with the temperature between 0 to 20° C. Thus, the charging time period at low temperature can be shortened without shortening the cycle life.

The first -stage charging current I1 is a known value. Accordingly, the second-stage charging electricity quantity to be supplied in the second stage can be obtained by accurately measuring the time period t1 automatically changing as a function of the electricity quantity discharged before charging (Qd) and the temperature Tb. The second-stage charging time period t6 can be accurately found by obtaining the second-stage current I6 based on the measured temperature Tb. In other words, the second-stage charging current I6 and the charging time period t6 can be determined based on the charging time period t1 from the start of the first-stage charging until the first stage is switched to the second stage, and the cell temperature Tb.

Figure 9:
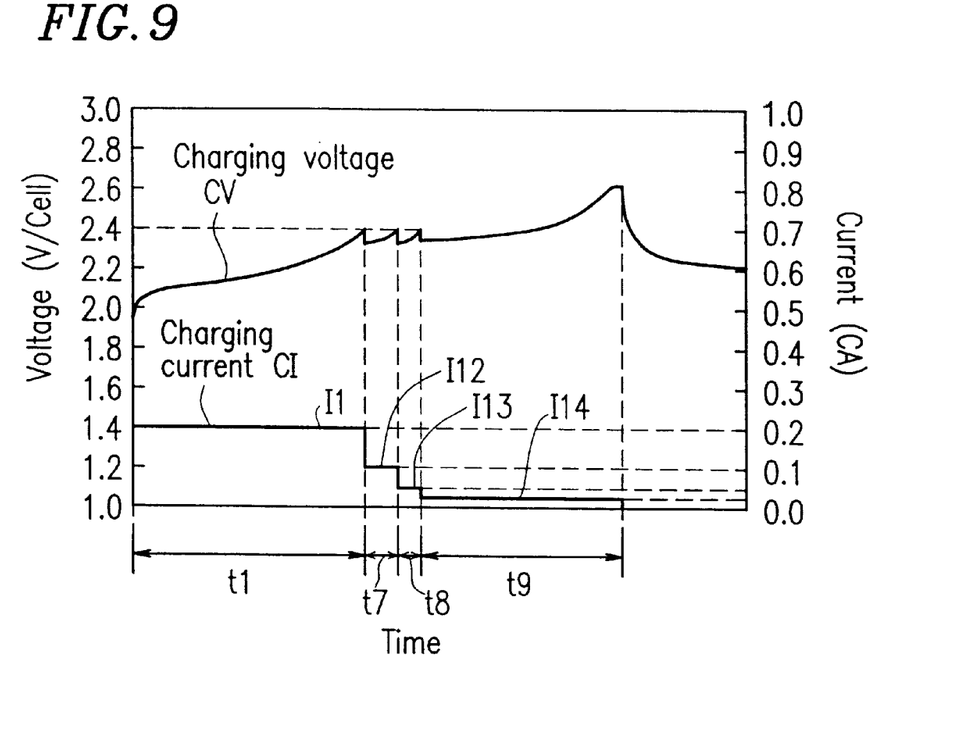
FIG. 9 is a graph illustrating a charging pattern in yet another example according to the present invention.
Figure 10:
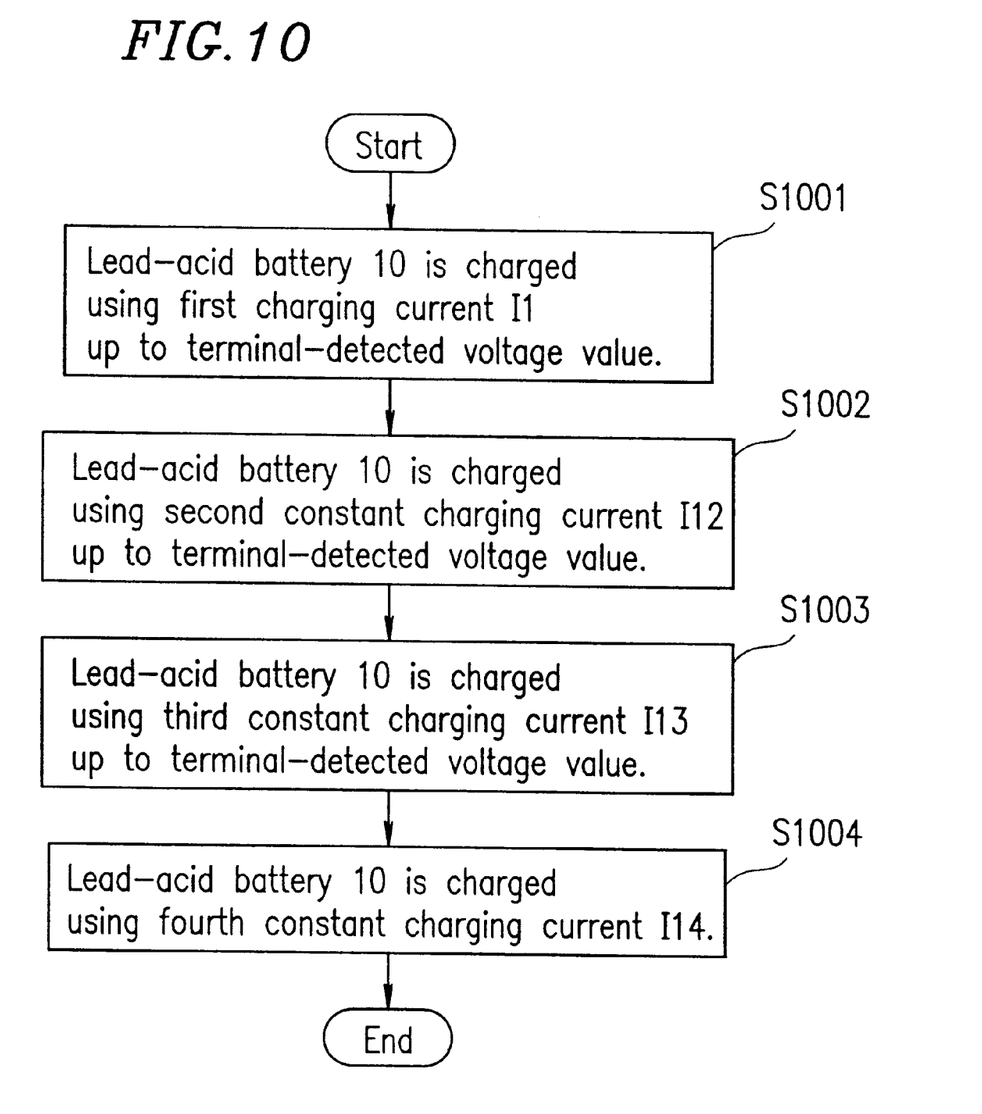
FIG. 10 is an alternate flowchart illustrating a charging method according to the present invention.

FIG. 9 shows a charging pattern in yet another example according to the present invention. FIG. 10 is a flowchart showing a method for charging in the context of the pattern shown on FIG. 9.

It is possible to further shorten the charging time period by combining the charging method described above with reference to FIGS. 7 and 8 and a multiple-stage constant current charging system including two or more stages. The charging pattern and the flowchart of the charging method in such a case are shown in FIGS. 9 and 10.

With reference to FIGS. 9 and 10, the charging section 13 charges the lead lead-acid battery 10 using a first charging current I1 (e.g., 0.2 CA) until the voltage becomes equal to a terminal-detected voltage value (e.g., 2.4 V/cell)(Step 1001). The charging section 13 charges the lead lead-acid battery 10 using a second charging current I12 (e.g., 0.1 CA) until the voltage becomes equal to a terminal-detected voltage value (e.g., 2.4 V/cell)(Step 1002). The charging section 13 charges the lead lead-acid battery 10 using a third charging current I13 (e.g., 0.05 CA) until the voltage becomes equal to a terminal-detected voltage value (e.g., 2.4 V/cell)(Step 1003).

The charging section 13 charges the lead lead-acid battery 10 using a fourth charging current I14 (e.g., 0.025 CA)(Step 1004).

The second charging current I12, the third charging current I13 and the fourth charging current I14 are set by the control section 14 based on the appropriate charging electricity quantity (Ce×Qd) corresponding to the electricity quantity discharged before charging (Qd), the charging time period t1, the first charging current I1, and the temperature of the lead lead-acid battery 10 while the cell is charged with the first charging current I1.

In this manner, the n'th charging current is set based on the appropriate charging electricity quantity (Ce×Qd) corresponding to the electricity quantity discharged before charging (Qd), the charging time period ti required for the first-step charging, and the temperature of the lead lead-acid battery 10 while the cell is charged in the first step.

The third charging current I13 can be set by the control section 14 based on a charging time period t1, the first charging current I1, a charging time period t7, the second charging current I12, the appropriate charging electricity quantity (Ce×Qd), and the temperature of the lead lead-acid battery 10 while the cell is charged with the first charging current I1.

The fourth charging current I14 can be set by the control section 14 based on the charging time period t1, the first charging current I1, the charging time period t7, the second charging current I12, a charging time period t8, the third charging current I13, the appropriate charging electricity quantity (Ce×Qd), and the temperature of the lead lead-acid battery 10 while the cell is charged with the first charging current I1.

In other words, the n'th charging current can be set based on the appropriate charging electricity quantity (Ce×Qd) corresponding to the electricity quantity discharged from the lead lead-acid battery 10 before charging (Qd), a charging time period required for charging in each of first through (n-1)'th stages, and the temperature of the lead lead-acid battery 10 while the cell is charged in the first stage.

According to the charging method of the lead-acid battery described above with reference to FIGS. 7 through 10, the same effects as those of the charging method described with reference to FIG. 4 can be obtained.

What is claimed is:

1. A method for charging a lead lead-acid battery comprising:

measuring a temperature of the battery;

a first step of charging the lead lead-acid battery to a prescribed voltage; and a second step of calculating a second charging electricity quantity based on a first charging electricity quantity to which the lead lead-acid battery is charged in the first step, and charging the lead lead-acid battery based on the second charging electricity quantity.

2. A method for charging a lead lead-acid battery according to claim 1, wherein:

the first step includes the steps of:
charging the lead lead-acid battery to the prescribed voltage using a first constant charging current: and
charging the lead lead-acid battery until the lead lead-acid battery obtains a prescribed current, using the first constant charging voltage, the second step includes the step of charging the lead lead-acid battery for a prescribed time period using a second constant charging current which is lower than the first constant charging current, and the prescribed time period is set based on the first charging electricity quantity.

3. A method for charging a lead lead-acid battery according to claim 1, wherein:

the first step includes the step of measuring a cell temperature of the lead lead-acid battery, and the second step includes the step of, when the cell temperature is lower than a prescribed value, increasing the second charging electricity quantity by a level of a receivable charge coefficient reduced in the first step.

4. A method for charging a lead lead-acid battery according to claim 1, wherein:

the first step includes the steps of:
charging the lead lead-acid battery to the prescribed voltage using a first constant charging current; and
charging the lead lead-acid battery to the prescribed voltage using a second constant charging current which is lower than the first constant charging current, the second step includes the step of charging the lead lead-acid battery for a prescribed time period using a third constant charging current which is lower than either one of the first charging current or the second charging current, and the prescribed time period is set based on the first charging electricity quantity.

5. A method for charging a lead lead-acid battery according to claim 1, further comprising the step of adjusting a charging rate based upon the determined temperature of the battery.

6. A method for charging a lead lead-acid battery according to claim 1, further comprising the step of determining a quantity of electricity discharged before charging.

7. New method for charging a lead lead-acid battery according to claim 1, further comprising:

the step of controlling the rate at which said lead lead-acid battery is charged as a function of said measured battery temperature.

8. A method for charging a lead lead-acid battery, comprising:

a first step of charging the lead lead-acid battery to a prescribed voltage using a first constant charging current, and an n-stage step for charging the lead lead-acid battery using an n'th constant charging current, wherein the n'th constant charging current is set based on an appropriate charging electricity quantity corresponding to an electricity quantity discharged from the lead lead-acid battery, a charging time period required for charging in the first step, and a cell temperature of the lead lead-acid battery while the cell is charged in the first step; and n includes an integer of 2 or more.

9. A method for charging a lead lead-acid battery according to claim 8, further comprising the step of determining a quantity of electricity discharged before charging based on a quantity of electricity charging in the first step.

10. A method for charging a lead lead-acid battery according to claim 8, wherein:

the first step includes the step of measuring a cell temperature of the lead lead-acid battery, and the n-th stage step includes the step of, when the cell temperature is lower than a prescribed value, increasing the n'th charging electricity quantity by a level of a receivable charge coefficient reduced in the first step.

11. A method for charging a lead lead-acid battery, comprising:

an n-stage step of charging the lead lead-acid battery to a prescribed voltage using an n'th constant charging current, wherein the n'th constant charging current is set based on an appropriate charging electricity quantity corresponding to an electricity quantity discharged from the lead lead-acid battery, a charging time period required for charging in each of first through (n−1)th stages, and a cell temperature of the lead lead-acid battery while the cell is charged in the first stage: and n includes an integer of 2 or more.

12. A method for charging a lead lead-acid battery according to claim 11, further comprising the step of determining a quantity of electricity discharged before charging based on a quantity of electricity charging in an n'th step of the n-stage step of charging the lead lead-acid battery.

13. A method for charging a lead lead-acid battery according to claim 11, wherein:

an n-th step of the n-stage step of charging the lead lead-acid battery includes the step of measuring a cell temperature of the lead lead-acid battery, and the n-th stage step includes the step of, when the cell temperature is lower than a prescribed value, increasing the n'th charging electricity quantity by a level of a receivable charge coefficient reduced in the first step.

* * * * *